United States Patent
Summerer et al.

(10) Patent No.: US 10,661,386 B2
(45) Date of Patent: May 26, 2020

(54) APPARATUS FOR CUTTING METAL PLATES OUT OF A METAL STRIP

(71) Applicant: SCHULER AUTOMATION GMBH & CO. KG, Hessdorf (DE)

(72) Inventors: Matthias Summerer, Altdorf (DE); Alexander Seitz, Erlangen (DE)

(73) Assignee: SCHULER PRESSEN GMBH, Hessdorf (DE)

( * ) Notice: Subject to any disclaimer, the term of this patent is extended or adjusted under 35 U.S.C. 154(b) by 342 days.

(21) Appl. No.: 15/580,033

(22) PCT Filed: Jun. 10, 2016

(86) PCT No.: PCT/EP2016/063315
§ 371 (c)(1),
(2) Date: Dec. 6, 2017

(87) PCT Pub. No.: WO2016/198610
PCT Pub. Date: Dec. 15, 2016

(65) Prior Publication Data
US 2018/0133838 A1    May 17, 2018

(30) Foreign Application Priority Data

Jun. 12, 2015  (DE) .................. 10 2015 210 848
Sep. 15, 2015  (DE) .................. 10 2015 217 639
Sep. 28, 2015  (DE) .................. 10 2015 218 650

(51) Int. Cl.
*B23K 26/08*  (2014.01)
*B23K 26/38*  (2014.01)
(Continued)

(52) U.S. Cl.
CPC ........ *B23K 26/083* (2013.01); *B23K 26/0846* (2013.01); *B23K 26/0869* (2013.01);
(Continued)

(58) Field of Classification Search
CPC  B23K 26/142; B23K 26/083; B23K 26/0846; B23K 26/0869; B23K 26/0876;
(Continued)

(56) References Cited

U.S. PATENT DOCUMENTS 4,787,178 A  * 11/1988  Morgan ................... B26D 7/20
                                                       198/434
7,321,104 B2    1/2008  Wessner
(Continued)

FOREIGN PATENT DOCUMENTS

DE        19642159 A1    4/1998
DE     102004034256 A1    2/2006
(Continued)

OTHER PUBLICATIONS

PCT/ISA/210, "International Search Report for International Application No. PCT/EP2016/063315", dated Oct. 14, 2016.
(Continued)

*Primary Examiner* — Paul R Durand
*Assistant Examiner* — Robert K Nichols, II
(74) *Attorney, Agent, or Firm* — Manabu Kanesaka (57) ABSTRACT

An apparatus for cutting metal plates out of a metal strip includes a laser cutting apparatus that is movable back and forth in a transport direction of the metal strip, and a support device for supporting the metal strip to be cut. The support device includes a first support device having a first support strip and a second support device having a second support strip located opposite the first support strip, wherein the first and the second support strip are moved concurrently with the laser cutting apparatus such that a laser beam of the laser cutting apparatus is always oriented towards a gap formed between the first and the second support strip. A dust discharging device is arranged downstream of the support strips in a discharging direction directed away from the laser
(Continued)

cutting apparatus. The support strip and/or the dust discharge shaft includes a ventilation device for ventilating the gap.

27 Claims, 10 Drawing Sheets

(51) Int. Cl.
*B23K 26/142* (2014.01)
*B23K 26/16* (2006.01)
*B23K 37/04* (2006.01)
*B23K 37/047* (2006.01)
*B26D 7/20* (2006.01)
*B23K 101/16* (2006.01)

(52) U.S. Cl.
CPC ........ *B23K 26/0876* (2013.01); *B23K 26/142* (2015.10); *B23K 26/16* (2013.01); *B23K 26/38* (2013.01); *B23K 37/047* (2013.01); *B23K 37/0408* (2013.01); *B23K 2101/16* (2018.08); *B26D 2007/206* (2013.01)

(58) Field of Classification Search
CPC .... B23K 26/16; B23K 26/38; B23K 37/0408; B23K 37/47
USPC .................................................. 219/121.67
See application file for complete search history.

(56) References Cited

U.S. PATENT DOCUMENTS

| | | | |
|---|---|---|---|
| 8,044,321 B2 | 10/2011 | Graf | |
| 2006/0118529 A1 | 6/2006 | Aoki et al. | |
| 2008/0225398 A1* | 9/2008 | Blaser | B23K 7/002 359/614 |
| 2008/0230523 A1* | 9/2008 | Graf | B26F 3/008 219/121.67 |
| 2010/0206858 A1* | 8/2010 | Stegemann | B23K 26/704 219/121.67 |
| 2014/0216223 A1 | 8/2014 | Epperlein | |
| 2016/0214207 A1 | 7/2016 | Okazaki | |

FOREIGN PATENT DOCUMENTS

| | | |
|---|---|---|
| DE | 102011054361 A1 | 4/2013 |
| EP | 1586407 A1 | 10/2005 |
| WO | 2007/028576 A2 | 3/2007 |
| WO | 2015/037162 A1 | 3/2015 |

OTHER PUBLICATIONS

PCT/ISA/237, "Written Opinion of the International Searching Authority for International Application No. PCT/EP2016/0063315," dated May 12, 2017.

PCT/ISA/237, "International Preliminary Report on Patentability for International Application No. PCT/EP2016/0063315," dated May 12, 2017.

* cited by examiner

APPARATUS FOR CUTTING METAL PLATES OUT OF A METAL STRIP

RELATED APPLICATIONS

The present application is National Phase of International Application No. PCT/EP2016/063315 filed Jun. 10, 2016, and claims priorities from German Application No. 10 2015 210 848.1, filed Jun. 12, 2015, German Application No. 10 2015 217 639.8, filed Sep. 15, 2015, and German Application No. 10 2015 218 650.4, filed Sep. 28, 2015, the disclosure of which is hereby incorporated by reference herein in its entirety.

The invention relates to an apparatus for cutting metal plates out of a metal strip according to the preamble of claim 1.

Such an apparatus is disclosed in EP 1 586 407 A1.

The known apparatus has a dust discharge shaft directed in a discharging direction away from a laser cutting apparatus, this dust discharging shaft having a dust collection container fastened to it. The dust discharge shaft and the dust collection container attached to it are moved back and forth concurrently with the laser cutting apparatus in a transport direction of the metal strip to remove and collect cutting dust or hot dross particles arising during the laser cutting of sheets and plates.—The known apparatus has the disadvantage that cutting dust adheres to, or welds with, an underside of a metal [plate] cut from the metal strip, this underside facing the discharging direction. The cutting dust must subsequently be removed from the metal plate. This involves a great deal of effort.

The goal of the invention is to eliminate the disadvantages of the prior art. In particular, the goal is to indicate an apparatus that is simple to produce and that can produce metal plates without substantial adherence of cutting dust. Another goal of the invention is to avoid the step of removing cutting dust from the metal plate.

This is accomplished by the features of claim 1. Expedient embodiments of the invention follow from the features of the dependent claims.

The invention proposes providing at least one support strip and/or the dust discharging device with a ventilation device to ventilate the gap.

Providing a ventilation device makes it simple to avoid the formation of a backflow in the direction of the underside of the cut metal plate when the cutting dust is removed through the discharge shaft. The cutting dust is essentially completely removed into the dust discharging device. It is unnecessary to remove cutting dust or dross particles from the underside of the cut metal plate.

The inventive ventilation of the gap can be "passive" or "active". Passive ventilation involves sucking in air by the ventilation device. The air is sucked in, e.g., by a Venturi effect, which forms as a consequence of the cutting gas flow due to the cutting gas, which is directed in the discharging direction.—"Active" ventilation involves blowing and/or sucking air in the discharging direction by means of the ventilation device. In this case, a higher flow velocity forms in the discharging direction than forms in the case of passive ventilation. In this case, the flow velocity can also be controlled by open-loop or closed-loop control.—In particular, for active ventilation a fan can be provided to supply or remove air.

According to an advantageous embodiment, the ventilation device comprises ventilation channels that are provided in a support surface of the support strip, the support surface facing the laser cutting apparatus. The proposed embodiment is simple and economical to produce.

It is advantageous for the ventilation channels to extend over a length of the support surface extending in the transport direction. In particular, the ventilation channels can run parallel and/or at an angle to the transport direction. They can have a curved or bent course.

The dust discharging device can comprise a dust collection container and/or a dust discharge shaft extending from at least one of the support strips. This allows a targeted removal and collection of the cutting dust.

The ventilation device can also comprise ventilation passages, which reach through at least one of the support strips and/or the dust discharge shaft. Such ventilation passages, e.g., drill holes or slots, also allow additional ventilation beneath an underside of the metal strip and a metal [plate] cut out of it so that there is no unwanted backflow of the cutting dust formed during the cutting of the metal strip.

The ventilation channels and/or ventilation passages preferably serve for passive ventilation of the gap. However, they can also be a component of an active ventilation device.

According to another embodiment of the invention, the dust discharge shaft has a cross section that widens in the discharging direction. This also counteracts the formation of an unwanted backflow of cutting dust in the direction of the underside of the metal plate.

It is expedient for the support strips and/or the dust discharge shaft to be made of copper or of another essentially copper-containing alloy. It has been shown that the adherence of cutting dust to copper materials is especially small. In this case, ventilation channels and/or ventilation passages do not clog with cutting dust, even over a long service life. Thus, proper ventilation can always be ensured.

The dust discharge shaft can be attached to only one of the two support strips. In this case, it is simple for the dust discharge shaft be moved concurrently with the slot. Aside from this, the width of the slot can be changed when required.

The dust discharge shaft is advantageously formed by two walls extending in the discharging direction. The walls extend, e.g., essentially in one direction perpendicular to the transport direction. At least one of the walls can be attached to one of the support strips. In the side edge areas of the dust discharging channel, passages connected with the fan can be provided to form an air knife. This can prevent cutting dust in the edge areas of the metal strip getting on top of it or on top of the metal [plates] being cut out of it. Instead of the air knife, it is also possible to provide side walls, which run, approximately in the transport direction and are attached to at least one of the two walls that are located opposite one another.

In the inventive apparatus it is advantageous for a first means of conveyance to be arranged upstream of the first support means. In addition, a second means of conveyance can be arranged downstream of the second support means. This allows transport, in particular continuous transport, of the metal strip over the slot formed between the support strips. The first means of conveyance can comprise, e.g., a roller straightening machine. The first and/or the second means of conveyance can also comprise a conveyor belt and/or a roller conveyor.—It is advantageous for the first support means to be put on a first conveyor belt downstream of an end roller, and for the second support means to be put on a second conveyor belt upstream of another end roller, the two end rollers being arranged opposite one another. The two rollers located opposite one another are advantageously arranged at a predetermined distance from one another and are, in this arrangement, movable back and forth in the transport direction.

According to an advantageous embodiment, the dust discharge shaft is connected with the dust collection container, or is a component of it. That is, the dust collection container is consequently coupled at least with the first or the second support means. That is, the dust collection container is moved back and forth in the transport direction concurrently with the laser cutting apparatus. Providing a concurrent and largely closed dust collection container can further counteract an unwanted adherence of cutting dust to an underside of the metal strip.

According to another embodiment of the invention, a suction device connected with the dust collection container is provided to produce an exhaust flow directed from an intake opening of the dust collection container toward the interior of the container. An exhaust flow is advantageously selected so that it sucks air through the ventilation channels and/or ventilation passages to the interior of the container. In particular, the exhaust flow is selected to be strong enough that in the dust collection container there is no backflow that counteracts entry of a cutting gas flow coming from a cutting nozzle of the laser cutting apparatus.

Furthermore a liquid supply device can be provided to supply liquid to the interior of the container. This can cool hot cutting dust or hot dross particles entering into the dust collection container. It can prevent the dross particles sticking with an inside wall of the container.

The liquid supply device can have at least one nozzle placed near the intake opening of the dust collection container to produce a liquid spray. This allows especially efficient cooling of dross particles entering the dust collection container.

According to another embodiment, an inner surface facing the interior of the container has a layer on it that has a communicating pore space to absorb liquid supplied by the liquid supply device. The porous layer can be made, for example, from a sintered metal, from ceramic, from a fiberglass, or something similar. The fact that the porous layer is infiltrated with liquid counteracts an adherence of hot dross particles to the inner surface of the dust collection container.

According to another advantageous embodiment, the dust collection container extends in the y-direction over an entire width of the metal strip. It is expedient for the intake opening of the dust collection container to be slot-shaped and to extend in the y-direction. The dust collection container can, in particular be tubular, a tubular axis of the dust collection container extending approximately perpendicular to the direction of radiation of the laser beam.

It is possible to provide a mask extending in y-direction with a mask opening that is aligned with the slot-shaped intake opening and that can be moved back and forth in the y-direction in alignment with the laser beam by means of a movement device. The mask can be, for example, a stainless steel strip essentially overlapping the slot-shaped intake opening, which has an opening in the form of a mask opening. Providing a mask that is movable back and forth in the y-direction can prevent cutting dust already located in the dust collection container from being blown out of the intake opening by the cutting gas flow.

An axis of the preferably tubular dust collection container can also extend approximately parallel to the direction of radiation of the laser beam. In this case, it is possible to provide a movement device to move the dust collection container concurrently back and forth in the y-direction, in such a way that the laser beam is always aligned with the intake opening of the dust collection container. In this embodiment, it is possible to dispense with providing a mask and a dust discharge shaft. In this case, the dust collection container is expediently connected with a suction fan to produce an exhaust flow directed in the discharging direction.

In the y-direction, it is also possible to provide multiple dust collection containers arranged next to one another, whose axes run approximately parallel to the direction of radiation of the laser. If a dust collection container is clogged with cutting dust, another dust collection container can be concurrently aligned with the laser cutting apparatus.

It is advantageous for the dust collection container to have a discharge opening to remove cutting dust or liquid loaded with cutting dust. Downstream of the dust discharge shaft or the discharge opening, a stationary collection container can be provided.

Sample embodiments of the invention are explained in detail below using the drawings. The figures are as follows:

FIG. 5*b* A detail view according to FIG. 5*a.

Figure 1:
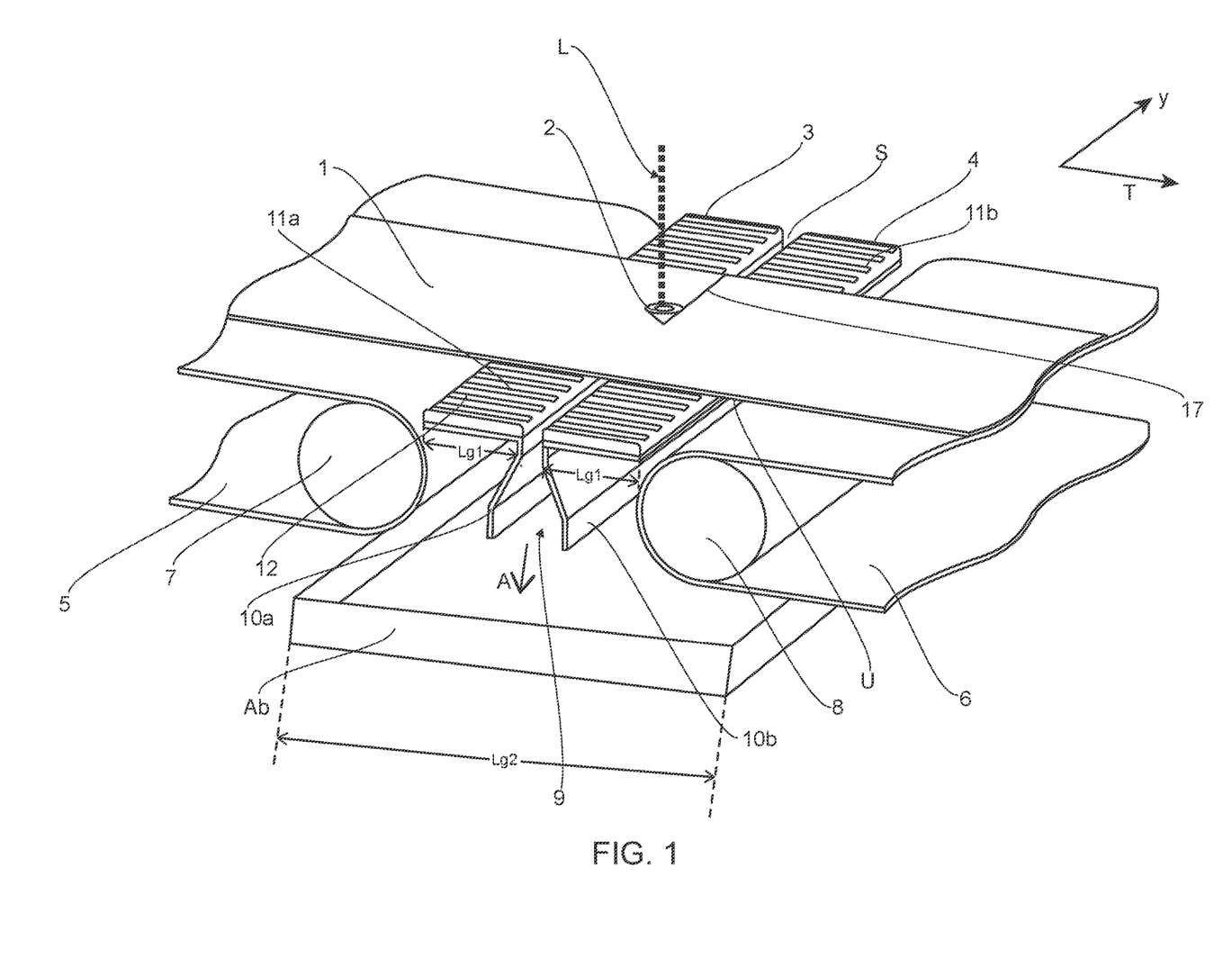
FIG. 1 A perspective partial view of a first apparatus.

FIG. 1 shows a first apparatus for cutting metal plates out of a metal strip 1 that is moved in a transport direction that is labeled with the reference letter T. Reference number 2 designates a cutting nozzle of a laser cutting apparatus (not shown here). The cutting nozzle 2 is movable in transport direction T and in a y-direction perpendicular to it by means of a conventional movement device, so that metal [plates] with a predetermined contour can be cut out of the metal strip 1. The metal strip 1 can be continuously moved in the transport direction T.

The cutting nozzle 2 is made so that it can guide cutting gas and a laser beam L onto the metal strip 1. In the cutting area, the metal strip 1 is supported on a first support strip 3 and a second support strip 4 arranged opposite the first one. The first 3 and the second support strips 4 extend approximately in the y-direction. The support strips 3, 4 have a gap S formed between them, through which a laser beam L runs. The first 3 support strip and the second support strip 4 are movable, by means of a conventional apparatus (not shown here), concurrently with the cutting nozzle 2. To accomplish this, the first support strip 3 can be connected with a first means of conveyance upstream of it, e.g., a first conveyor belt 5. Similarly, the second support strip 4 can be connected with a second means of conveyance arranged downstream of it, e.g., a second conveyor belt 6. First guide roller 7 and second guide roller 8 of the conveyor belts 5, 6, which are opposite one another, can be movable in a conventional manner concurrently with the cutting nozzle 2 of the laser cutting apparatus, forming the gap S. Concerning this, refer, for example, to DE 10 2004 034 256 A1, whose disclosure content concerning this is included by reference.

Reference number 9 generally designates a discharge shaft, which extends in a discharging direction A pointing away from the underside U of the metal strip 1. Here the discharge shaft 9 is formed by two walls 10a, 10b extending in the discharging direction A. The first wall 10a is attached to the first support strip 3 and the second wall 10b is attached to the second support strip 4. The walls 10a, 10b extend in the y-direction. They are designed so that a gap width of the gap S formed between them widens in discharging direction A. The support strips 3, 4 can also be formed in one piece with the respective wall 10a, 10b.

It is also possible for the two walls 10a, 10b to be connected with one another through connection walls (not shown here) extending in transport direction T. Such connection walls are expediently provided outside of a cutting area to the side in the y-direction. In this case, the discharge shaft 9 can be attached by means of only one of the two walls 10a or 10b to the support strip 3 or 4 corresponding to it.

The first 3 and the second support strip 4 each have a support surface 11a, 11b facing the cutting nozzle 2. Each of the support surfaces 11a, 11b is provided with ventilation channels 12 extending approximately in transport direction T. Here the ventilation channels 12 extend over an entire first length Lg1 of the support strips 3, 4, so that if metal strip 1 is lying on the support surfaces 11a, 11b the ventilation channels 12 can supply air to the gap S.

The reference number Ab designates a collection container that is downstream of the discharge shaft 9 in the discharging direction A. The collection container Ab is not connected with the discharge shaft 9, i.e., the collection container Ab is stationary relative to the discharge shaft 9. A second length Lg2 of the collection container Ab extends in the transport direction T over at least a predetermined movement range of the concurrently moved discharge shaft 9. Because the collection container Ab is stationary, the masses to be moved concurrently can be kept small. In this case, the gap S can be moved especially quickly and exactly with the laser beam L.

Figure 2:
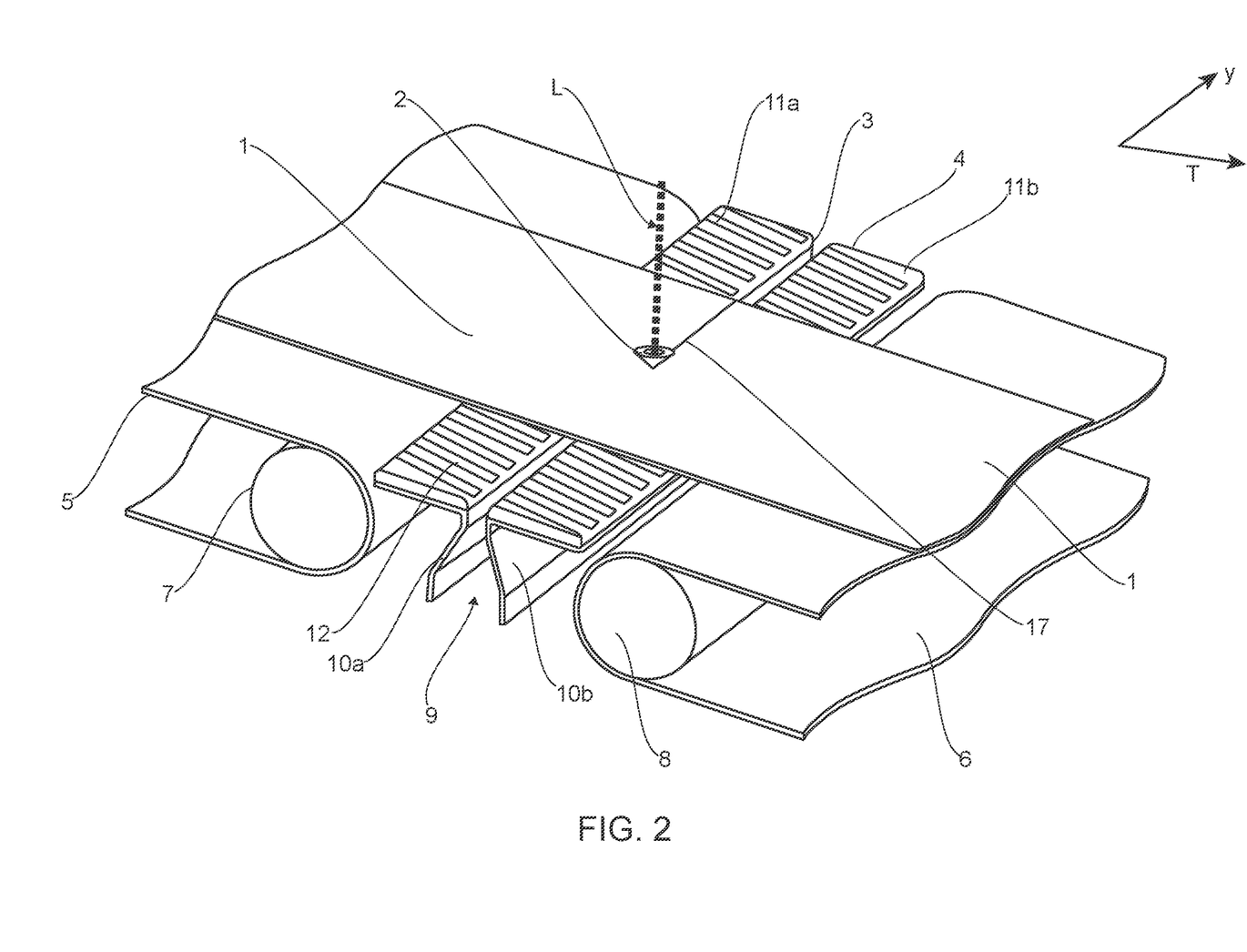
FIG. 2 A perspective partial view of a second apparatus.

In the second apparatus shown in FIG. 2, the ventilation channels 12 run at an angle to the transport direction T. They extend over the entire first length Lg1 of the first support surface 11a and the second support surface 11b of the support strips 3, 4.

Figure 3:
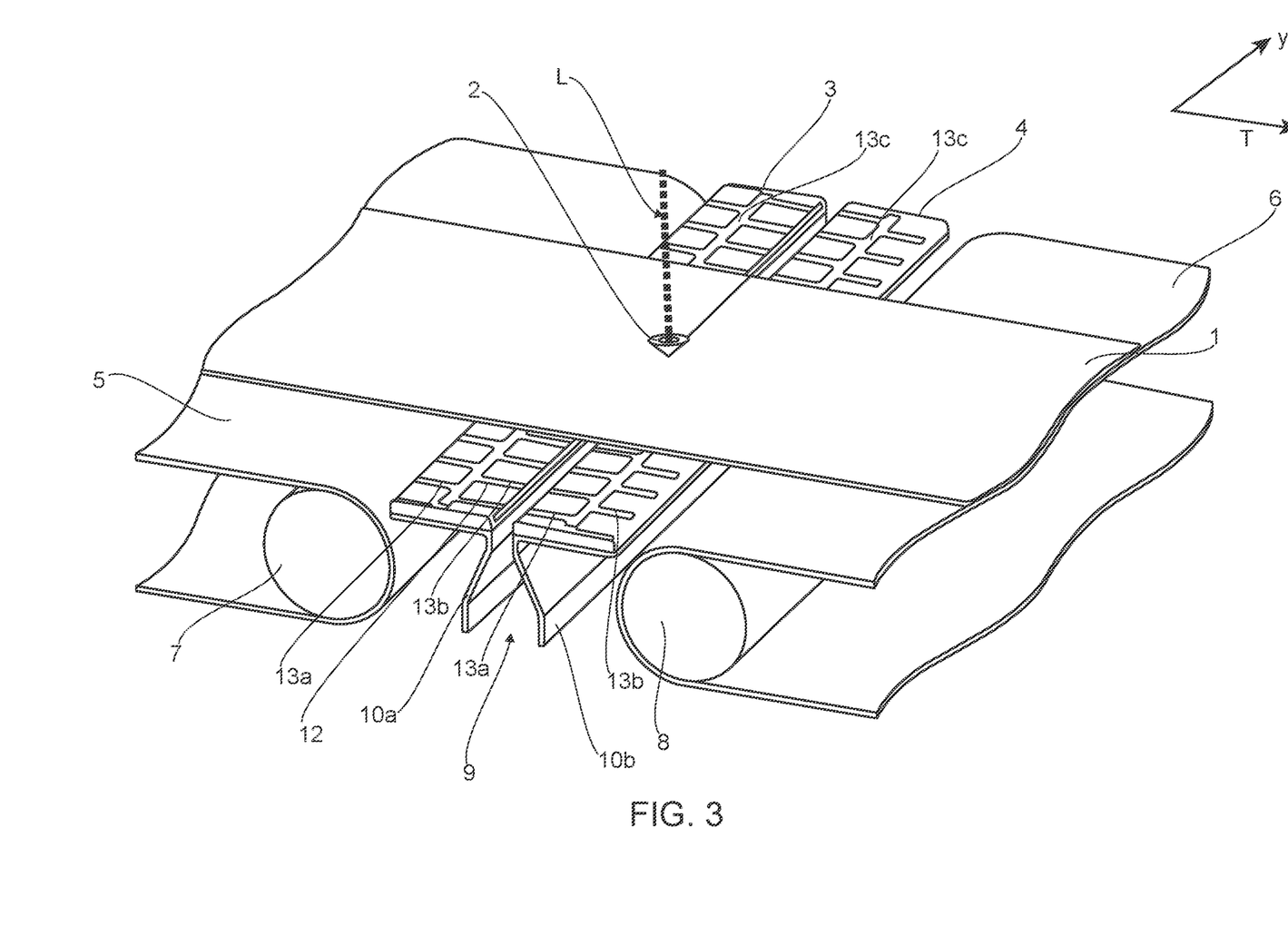
FIG. 3 A perspective partial view of a third apparatus.

In the third apparatus shown in FIG. 3, the ventilation channels 12 are each organized into two sections 13a, 13b, which are arranged offset to one another in the transport direction T. The sections 13a, 13b are connected with one another through a connection channel 13c running approximately in the y-direction.

Figure 4:
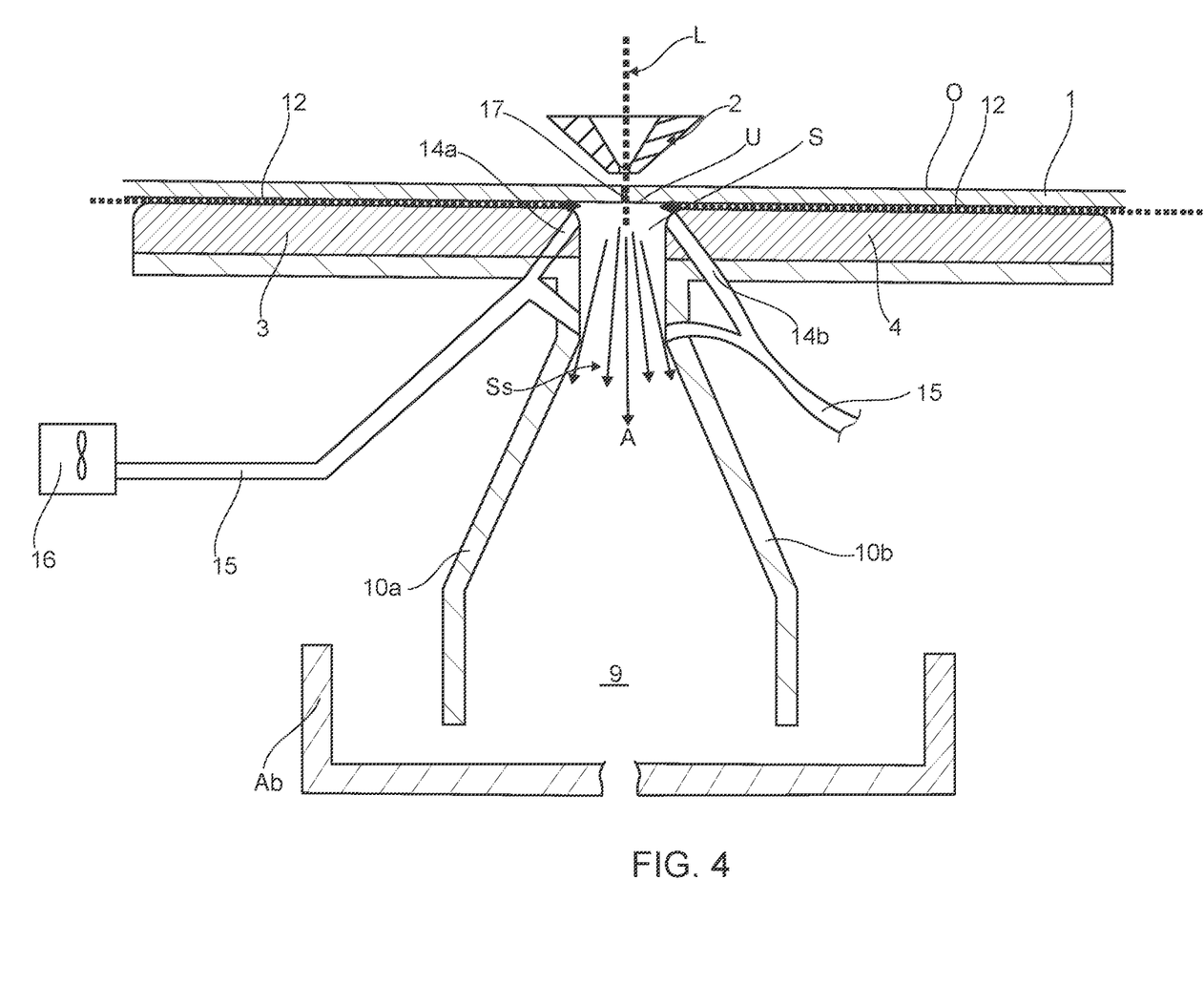
FIG. 4 A sectional view through a fourth apparatus.

In the fourth apparatus shown in FIG. 4, the first support strip 3 is provided with a first ventilation passage 14a and the second support strip 4 is provided with a second ventilation passage 14b.

The ventilation passages 14a, 14b can be connected, through pipes 15 that are only schematically indicated here, with a fan 16 that is also schematically indicated.

Figure 5A:
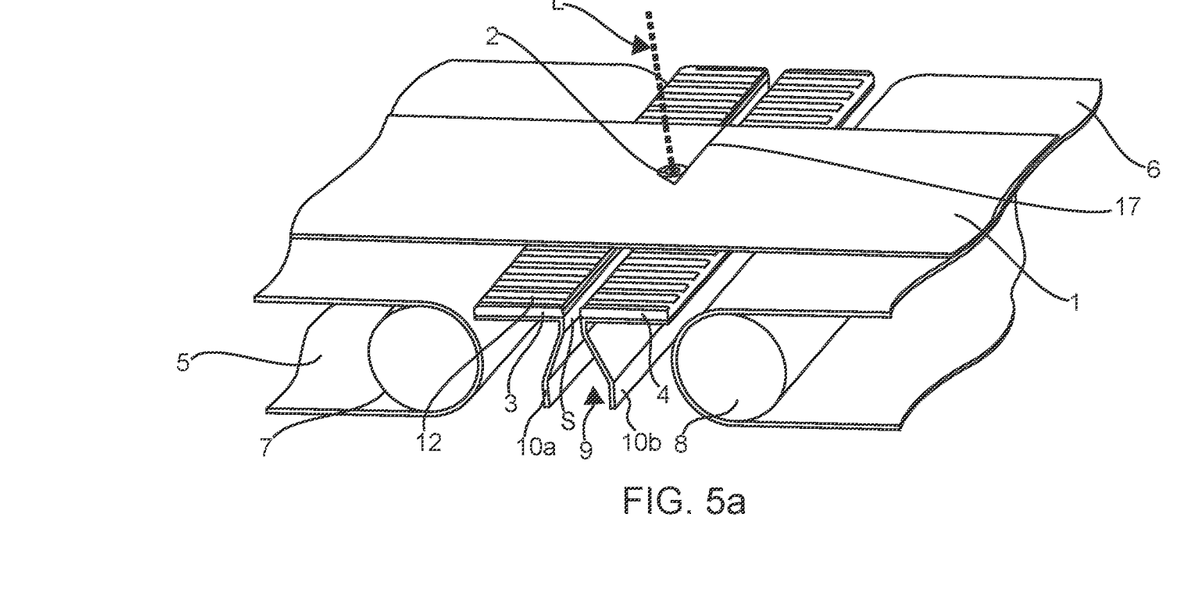
FIG. 5*a* A perspective partial view of a fifth apparatus.
Figure 5B:
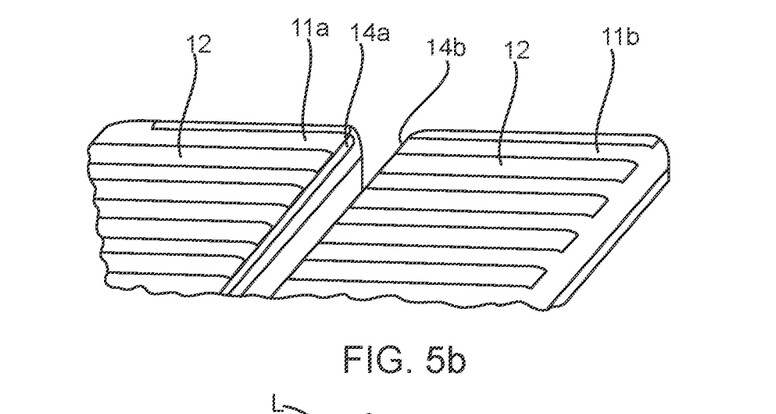

In the fifth apparatus shown in FIGS. 5a and 5b, the support strips 3, 4 have ventilation channels 12, as shown in FIG. 1. In addition, ventilation passages 14a, 14b are provided in an edge area of the support strips 3, 4.

The function of the apparatus will now be explained in detail.

During the cutting of the metal strip 1, cutting gas exits from the cutting nozzle 2. A cutting gas flow forms, which is directed through the one cut 17 in the metal strip 1 in the direction of the gap S. Cutting dust Ss formed during cutting is removed into the discharge shaft 9 with the cutting gas flowing in the discharging direction A. The cutting gas flow produces a Venturi effect, which sucks air in through the ventilation channels 12 and/or the ventilation passages 14a, 14b. This avoids the formation of a backflow in the direction of the underside U of the metal strip 1. Cutting dust Ss is not transported against the underside U.

The fan 16 can also blow compressed air through the pipes 15 and the ventilation passages 14a, 14b into the cutting gap S. This can even more effectively prevent the formation of a backflow against the underside U. A mass flow of air, especially that supplied through the ventilation passages 14a, 14b can be controlled, e.g., as a function of a gap width of the gap S. To accomplish this, at least one control valve can be arranged downstream of the fan 16 (not shown here).

The ventilation passages 14a, 14b can also be arranged outside of a cutting area to the side in the y-direction. This can produce an air knife in this area by means of compressed air. The air knife can prevent an escape of cutting dust Ss to the side and soiling of a top O opposite the underside U of the metal strip 1. In this case, connection walls are unnecessary.

According to another embodiment not separately shown in the figures, a cold trap can also be provided downstream of the gap S, in particular in the area of the first wall 10a and the second wall 10b. The cold trap can be formed, for example, by multiple nozzles provided in [the first wall] 10a and/or the second wall 10b, through which cold air, especially cold dry air, or cold nitrogen, which is expediently produced by evaporation of liquid nitrogen, is blown in. Of course the cold trap can also have another design. For example, one or more pipes running in the transverse direction Q can be provided in the area of the walls 10a, 10b or the discharge shaft 9, these pipes having a coolant running through them.

Guiding the cutting dust Ss downstream into or through a cold trap cools off the cutting dust particles. It has been shown that cold cutting dust particles have a smaller tendency to adhere to the underside U of the metal strip.

The ventilation device 12, 13a, 13b, 13c, 14a, 14b can also be omitted and the apparatus for cutting metal plates can instead be provided only with a cold trap arranged downstream of the gap S.

Figure 6:
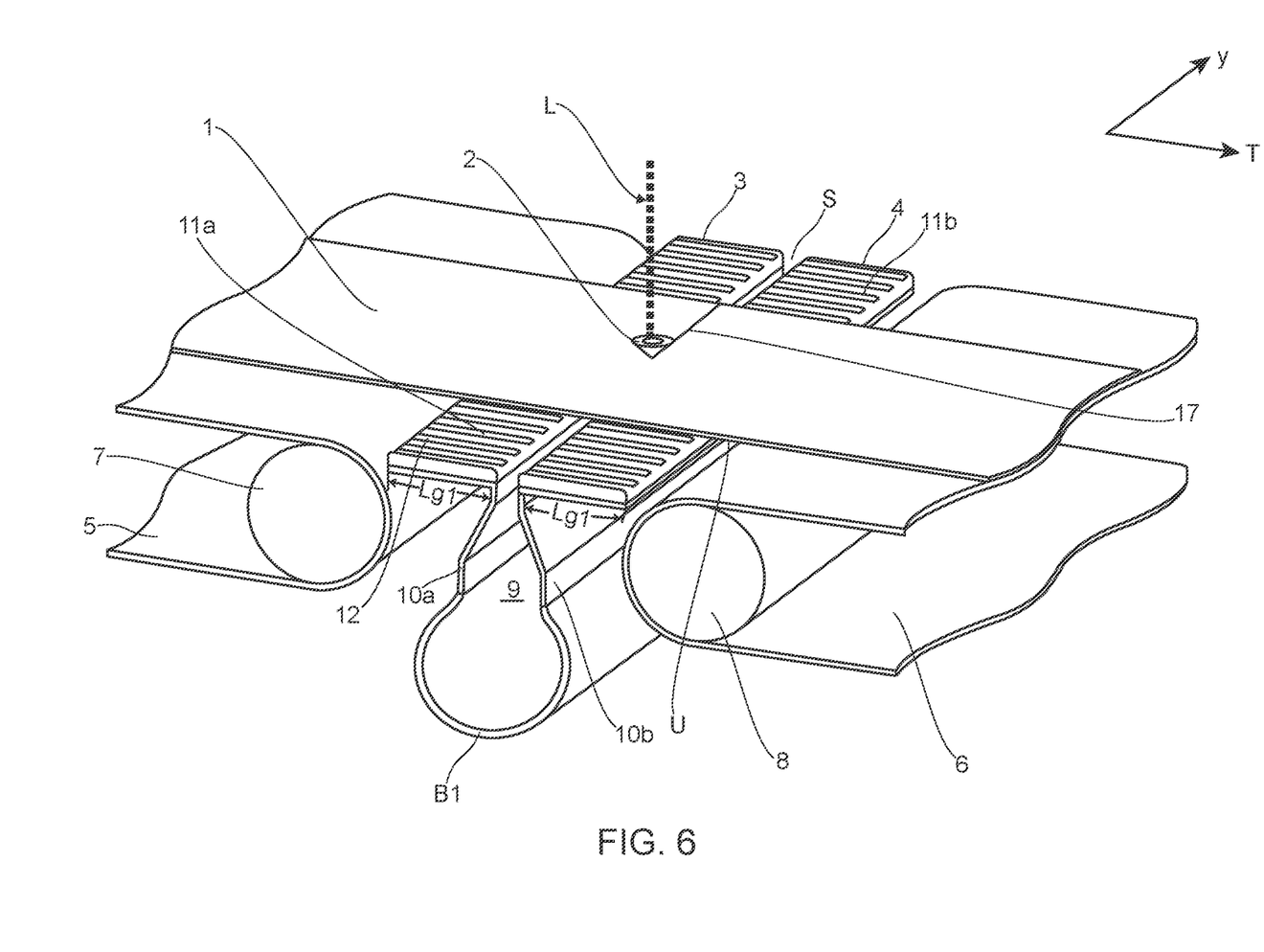
*
FIG. 6 A perspective partial view of a sixth apparatus.

In the sixth apparatus shown in FIG. 6, the walls 10a, 10b of the discharge shaft 9 are connected with a first container B1 that is tubular. An axis of the tubular first container B1 extends approximately parallel to the gap S. In this case, the first support strip 3 and the second support strip 4 are coupled either with a first conveying device or with a second conveying device, so that support strips 3, 4 can be moved back and forth in the transport direction T together with the first container B1.

Figure 7:
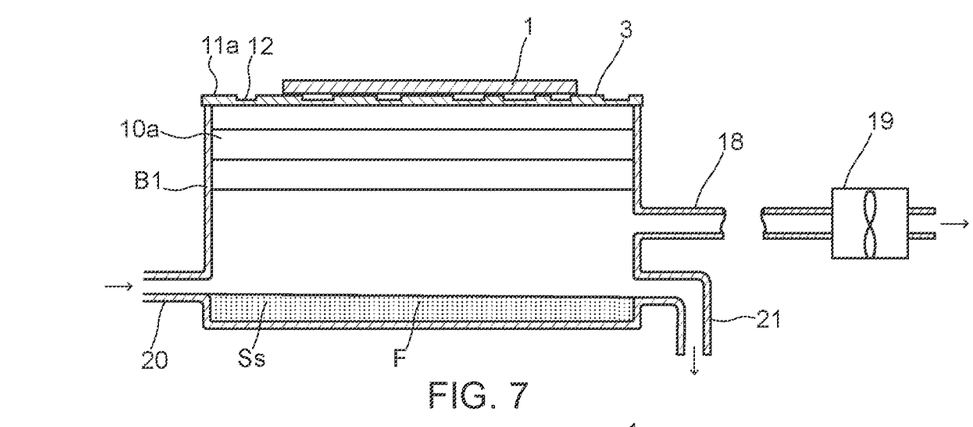
FIG. 7 A vertical section according to FIG. 6, along the gap.

As can be seen especially from FIG. 7, the first container B1 is provided with a suction pipe 18, which is connected to a suction fan 19. Furthermore, a liquid supply pipe 20 is provided, which can be provided with a (not shown here) pump or something similar to supply liquid F, especially water. Reference number 21 designates a liquid discharge pipe.

The sixth device operates as follows:

The cutting dust Ss that gets into the gap S due to the cutting gas flow during cutting is sucked into the first container B1, in particular by the effect of the suction fan 19. The cutting dust Ss is cooled by the liquid F located in the first container B1 and discharged through the liquid discharge pipe 21.

Figure 8:
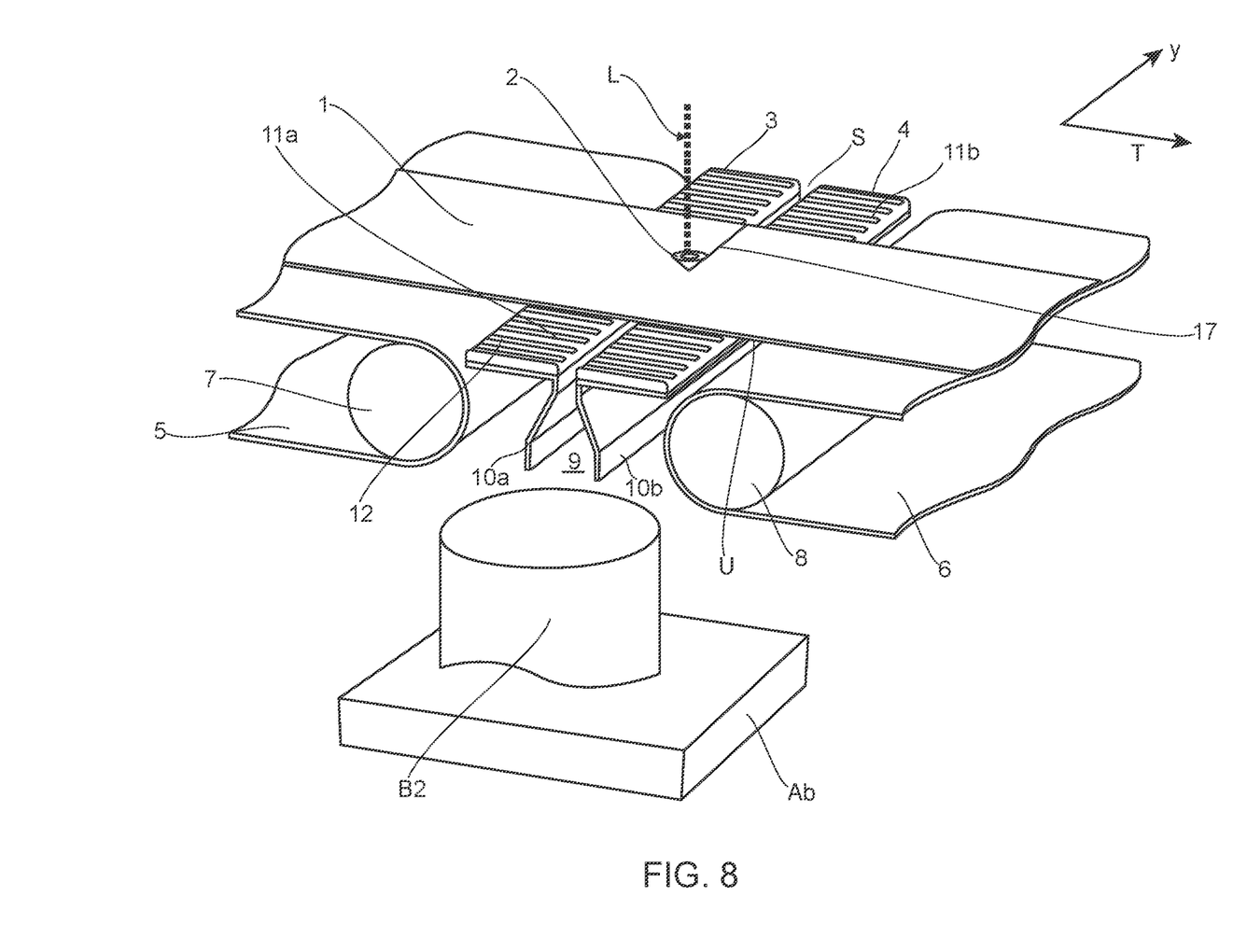
FIG. 8 A perspective partial view of a seventh apparatus.
Figure 9:
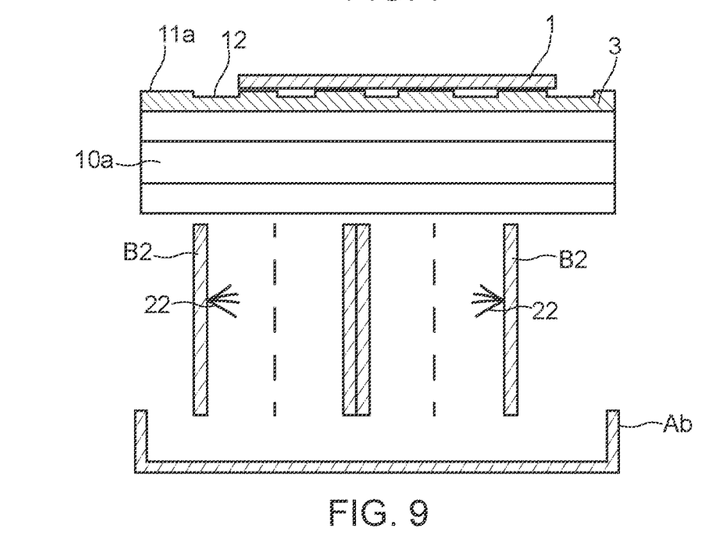
FIG. 9 A vertical section according to FIG. 8, along the gap.

FIGS. 8 and 9 show a seventh apparatus. The seventh apparatus has one or more tubular second container(s) B2 downstream of the discharge shaft 9. An axis of the tubular second container B2 runs approximately parallel to the axis of the laser beam L. The second container B2 can be moved back and forth both in the transport direction T and also in the y-direction in such a way that the laser beam L exactly enters into the second container B1. To move the second container back and forth in the transport direction T, it can be guided, for example in a guideway extending in the y-direction, which is coupled to the first support strip 3 or the second support strip 4. To move it back and forth in the y direction, a separate movement device (not shown here) is provided, which is coupled by control technology with a device to move the laser cutting apparatus.

As can be seen especially from FIG. 9, in the y-direction it is also possible for multiple second containers B2 connected with one another to be provided next to one another. Downstream of the second container B2, a stationary collection container Ab is provided.

The seventh apparatus operates as follows:

A second container B2 is concurrently moved with the laser beam L so that the laser beam L enters approximately into the center of the second container B2. Cutting dust Ss is cooled by the effect of a liquid spray produced by means of nozzles 22 and is then supplied to the collection container Ab. If multiple second containers B2 are provided, it is possible to switch over to another second container B2 if one of the second containers B2 is obstructed. I.e., it is then the other second container B2 that is aligned with the laser beam L.

The at least one second container B2 can be coupled with a suction fan 19, similar to what is shown in FIG. 7.

Figure 10:
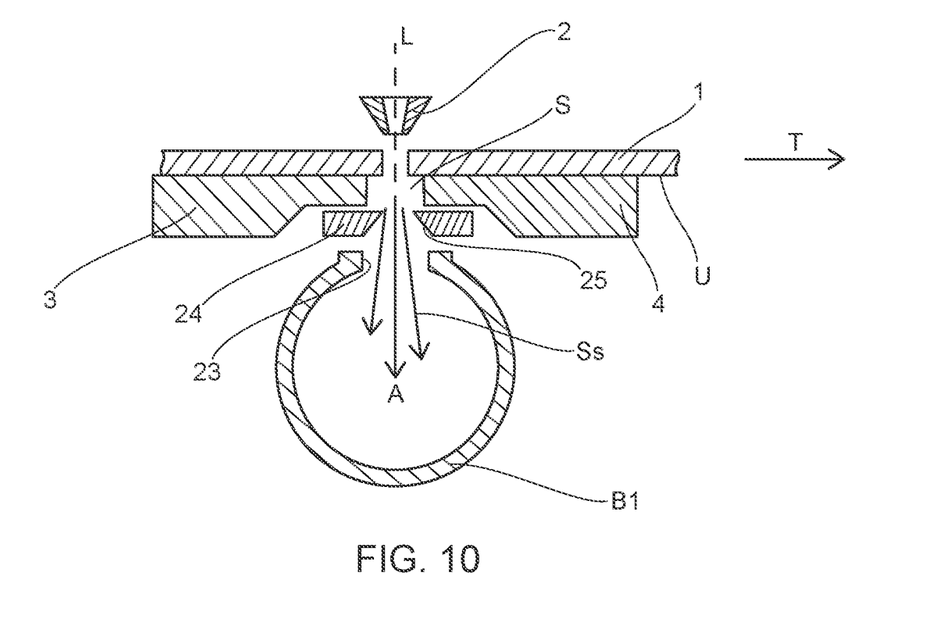
FIG. 10 A sectional view through an eighth apparatus.
Figure 11:
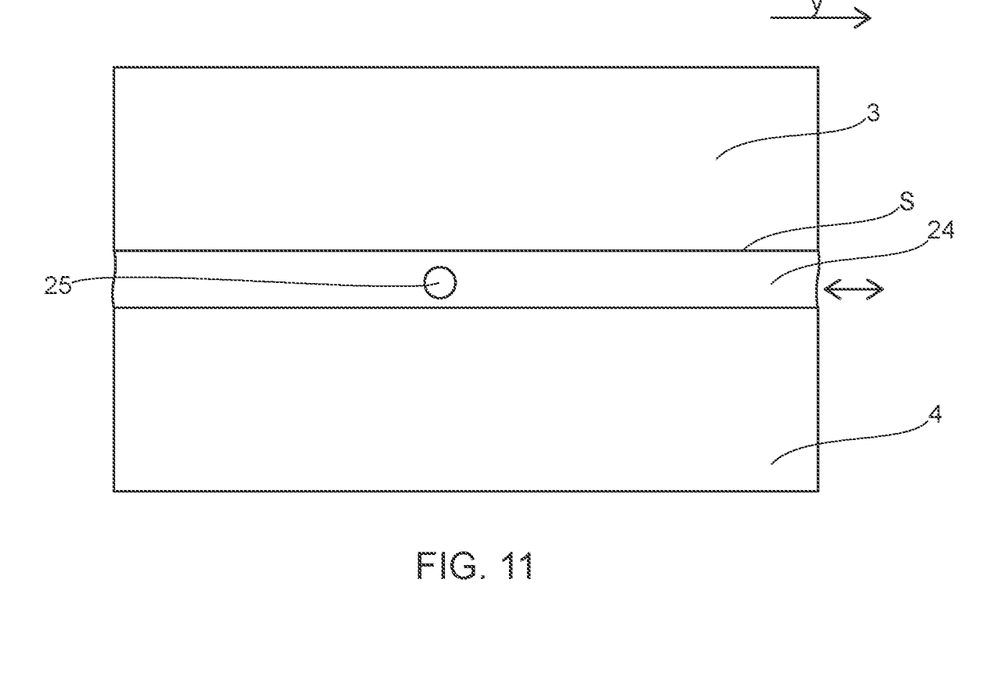
FIG. 11 A top view of the eighth apparatus.

FIGS. 10 and 11 show an eighth apparatus. The eighth apparatus has a similar design to the sixth apparatus. The first support strip 3 and the second support strips 4 have, arranged downstream of them in the discharging direction A, a tubular first container B1 whose axis extends approximately parallel to the gap S. The first container B1 has a slot-shaped intake opening 23 extending parallel to the gap S. Reference number 24 designates a mask made of a stainless steel strip, for example, which has a mask opening 25. The mask 24 essentially covers the slot-shaped intake opening 23 of the first container B1. The mask 24 is moved back and forth in the y-direction in alignment with the laser beam L by means of a movement device not shown in detail here. The first container B1 and the (not shown here) movement device and the mask 24 are advantageously connected with one of the two support strips 3, 4, so that the other support strip 3, 4 can be moved back and forth in the transport direction relative to the mask 24 and to the first container B1.

In the eighth apparatus the discharge shaft can be omitted. Furthermore, it is expedient for the first container B1 to be coupled with a suction fan 19 (not shown here), similar to how it was with the sixth apparatus, so that a flow is produced that is directed through the mask opening 25 and the slot-shaped intake opening 23 into the inside of the first container B1.

The eighth device operates as follows:

The cutting dust Ss produced by means of the laser beam L during cutting is sucked by the effect of the suction fan through the mask opening 25 and the slot-shaped intake opening 23 into the inside the first container B1. Moving the mask opening 25 back and forth in the y-direction always in alignment with the laser beam L can prevent cutting dust Ss already held in the first container B1 from being swirled up, ejected out of the first container B1 through the slot-shaped intake opening 23, and adhering to the underside U of the metal strip 1.

Figure 12:
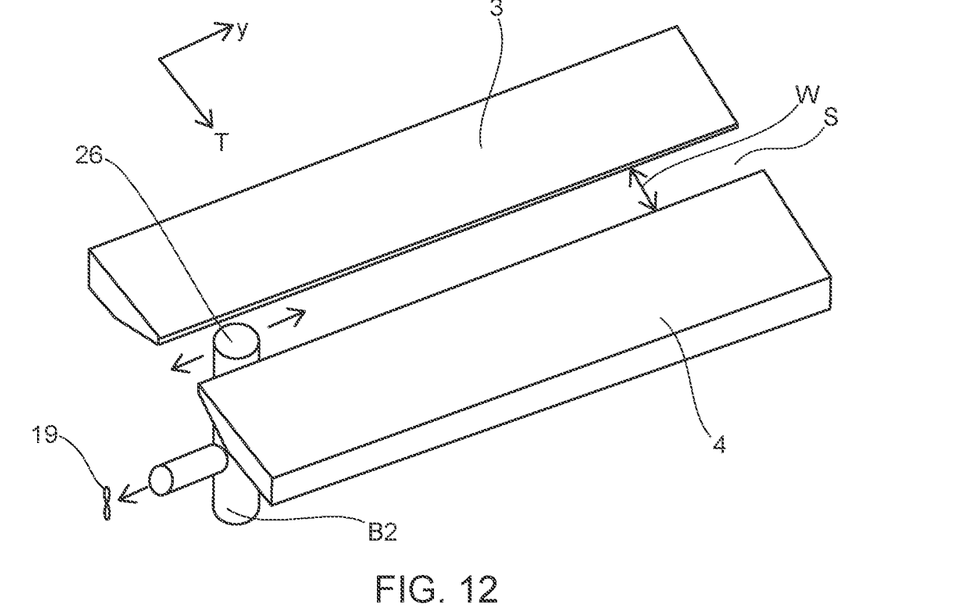
FIG. 12 A perspective view of a ninth apparatus.
Figure 13:
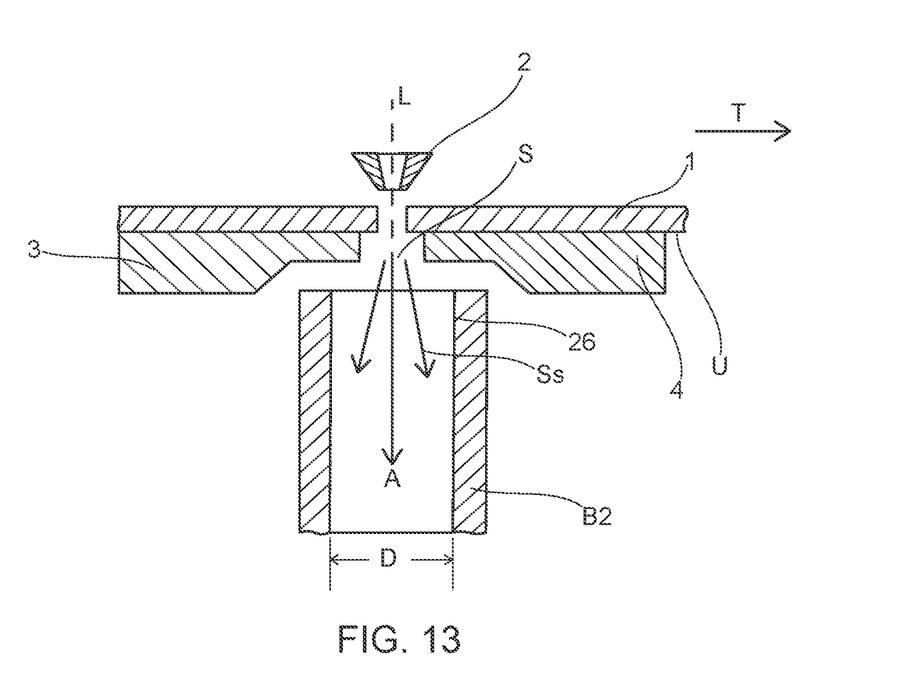
FIG. 13 A sectional view of the ninth apparatus.

FIGS. 12 and 13 show a ninth apparatus. The ninth apparatus has a similar design to the seventh apparatus. However, here the discharge shaft 9 is omitted. The second container B2, whose axis extends approximately parallel to the laser beam L can be moved back and forth in the y-direction with a movement device (not shown here) so that another intake opening 26 of the second container B2 is always aligned with the laser beam L. It is expedient for the second container B2 to be connected with a suction fan 19, so that a suction flow forms from gap S toward the other intake opening 26.

As can be seen especially from FIG. 13, it is advantageous for a width W of the gap S in the transport direction to be adjusted so that it is smaller than an inside diameter D of the second container B2.

LIST OF REFERENCE NUMBERS

1 Metal strip
2 Cutting nozzle
3 First support strip
4 Second support strip
5 First conveyor belt
6 Second conveyor belt
7 First guide roller
8 Second guide roller
9 Discharge shaft
10a First wall
10b Second wall
11a First support surface
11b Second support surface
12 Ventilation channel
13a, b Section
13c Connection channel
14a First ventilation passage
14b Second ventilation passage
15 Pipe
16 Fan
17 Section
18 Suction pipe
19 Suction fan
20 Liquid supply pipe
21 Liquid discharge pipe
22 Nozzle
23 Slot-shaped intake opening
24 Mask
25 Mask opening
26 Other intake opening
A Discharging direction
Ab Collection container
B1 First container
B2 Second container
D Inside diameter
F Liquid
L Laser beam
Lg1 First length
Lg2 Second length
O Top
y Transverse direction
S Gap
Ss Cutting dust
T Transport direction
U Underside
W Width

The invention claimed is:

1. An apparatus for cutting metal plates out of a metal strip (1), comprising:
    a laser cutting apparatus (2) that is movable back and forth in a transport direction (T) of the metal strip (1);
    a support device (3, 4) for supporting the metal strip (1) to be cut, said support device (3, 4) being movable back and forth in the transport direction concurrently with the laser cutting apparatus (2);
    wherein the support device comprises first support means having a first support strip (3) and second support means having a second support strip (4) located opposite the first support strip (3), wherein the first (3) and the second support strip (4) are moved concurrently with the laser cutting apparatus (2) such that a laser beam (L) of the laser cutting apparatus (2) is always oriented towards a gap (S) formed between the first (3) and the second support strip (4); and
    a dust discharging device (9) arranged downstream of the support strips (3, 4) in a discharging direction (A) directed away from the laser cutting apparatus (2);
    wherein the dust discharging device (9) and/or at least one support strip (3, 4) is/are provided with a ventilation device (12, 13a, 13b, 13c, 14a, 14b) for ventilating the gap (S), and
    wherein the ventilation device (12, 13a, 13b, 13c, 14a, 14b) comprises ventilation channels (12, 13a, 13b, 13c) that are provided in a support surface (11a, 11b) of the support strip (3, 4), the support surface facing the laser cutting apparatus (2).

2. An apparatus according to claim 1, wherein the ventilation channels (12, 13a, 13b, 13c) extend over a length (Lg1) of the support surface (11a, 11b) extending in the transport direction (T).

3. An apparatus according to claim 1, wherein the ventilation channels (12, 13a, 13b, 13c) run parallel or at an angle to the transport direction (T).

4. An apparatus according to claim 1, wherein the ventilation device (12, 13a, 13b, 13c, 14a, 14b) comprises ventilation passages (14a, 14b), which reach through at least one of the support strips (3, 4) and/or the dust discharge shaft (9) and/or the dust collection container (B1, B2).

5. An apparatus according to claim 4, wherein a fan (16) is provided to supply air to the ventilation channels (12, 13a, 13b, 13c) and/or ventilation passages (14a, 14b).

6. An apparatus according to claim 1, wherein first means of conveyance (5, 7) are arranged upstream of the first support means, and wherein second means of conveyance (6, 8) are arranged downstream of the second support means.

7. An apparatus according to claim 6, wherein the first (5, 7) and/or second means of conveyance (6, 8) is/are a conveyor belt and/or a roller conveyor.

8. An apparatus according to claim 1, wherein the dust discharging device (9) comprises a dust collection container (B1, B2) and/or a dust discharge shaft extending from at least one of the support strips (3, 4).

9. An apparatus according to claim 8, wherein the dust discharge shaft (9) has a cross section that widens in the discharging direction (A).

10. An apparatus according to claim 8, wherein the support strips (3, 4) and/or the dust discharge shaft (9) is/are made of copper or of another essentially copper-containing alloy.

11. An apparatus according to claim 8, wherein the dust discharge shaft (9) is attached to only one of the two support strips (3, 4).

12. An apparatus according to claim 8, wherein the dust discharge shaft (9) is formed by two walls (10a, 10b) extending in the discharging direction (A), at least one of the walls (10a, 10b) being attached to one of the support strips (3, 4).

13. An apparatus according to claim 8, wherein in an edge area of the dust discharge shaft (9) passages (14a, 14b) connected with the fan (16) are provided to form an air knife.

14. An apparatus according to claim 8, wherein the dust discharge shaft (9) is connected with the dust collection container (B1), or is a component of the dust collection container.

15. An apparatus according to claim 8, wherein the dust collection container (B1, B2) is connected with a suction device (18, 19) to produce an exhaust flow (A) directed from an intake opening of the dust collection container (B1, B2) towards an interior of the dust collection container.

16. An apparatus according to claim 15, wherein a liquid supply device (20) is provided to supply liquid (F) to the interior of the dust collection container.

17. An apparatus according to claim 16, wherein the liquid supply device (20) has at least one nozzle (22) placed near an intake opening of the dust collection container (B1, B2) to produce a liquid spray.

18. An apparatus according to claim 16, wherein an inner surface facing the interior of the dust collection container has a layer that has a communicating pore space to absorb liquid (F) supplied by the liquid supply device (20).

19. An apparatus according to claim 8, wherein the dust collection container (B1) extends in the y-direction over an entire width of the metal strip (1).

20. An apparatus according to claim 8, wherein an intake opening of the dust collection container (B1) is slot-shaped and extends in the y-direction.

21. An apparatus according to claim 20, wherein a mask extending in y-direction is provided with a mask opening that is aligned with the slot-shaped intake opening and that can be moved back and forth in the y-direction in alignment with the laser beam by means of a movement device.

22. An apparatus according to claim 8, wherein the dust collection container (B1, B2) is tubular.

23. An apparatus according to claim 8, wherein an axis of the dust collection container (B2) is approximately parallel to a direction of radiation of the laser beam (L).

24. An apparatus according to claim 23, wherein a movement device is provided to move the dust collection container (B2) concurrently back and forth in the y-direction, in such a way that the laser beam is always aligned with the intake opening of the dust collection container (B2).

25. An apparatus according to claim 23, wherein in the y-direction, multiple dust collection containers (B2) are provided arranged next to one another, whose axes run approximately parallel to the direction of radiation of the laser beam (L).

26. An apparatus according to claim 8, wherein the dust collection container (B1, B2) has an discharge opening (21) to remove cutting dust (Ss) or liquid (F) loaded with cutting dust (Ss).

27. An apparatus according to claim 26, wherein a stationary collection container (Ab) is provided downstream of the dust discharge shaft (9) or the discharge opening (21).

* * * * *